US010962653B2

(12) United States Patent
Hou

(10) Patent No.: US 10,962,653 B2
(45) Date of Patent: Mar. 30, 2021

(54) POSITIONING METHOD AND APPARATUS

(71) Applicant: Huawei Technologies Co., Ltd., Shenzhen (CN)

(72) Inventor: Chunqing Hou, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/603,499

(22) PCT Filed: Apr. 24, 2017

(86) PCT No.: PCT/CN2017/081727
§ 371 (c)(1),
(2) Date: Oct. 7, 2019

(87) PCT Pub. No.: WO2018/184263
PCT Pub. Date: Oct. 11, 2018

(65) Prior Publication Data
US 2020/0371251 A1  Nov. 26, 2020

(30) Foreign Application Priority Data

Apr. 6, 2017 (CN) .......................... 201710222015.6

(51) Int. Cl.
*G01S 19/25* (2010.01)
*H04W 4/029* (2018.01)

(52) U.S. Cl.
CPC .............. *G01S 19/25* (2013.01); *H04W 4/029* (2018.02)

(58) Field of Classification Search
CPC ....... H04W 4/02; H04W 4/021; H04W 4/025; H04W 4/029; H04W 4/30; H04W 64/00;
(Continued)

(56) References Cited

U.S. PATENT DOCUMENTS

2008/0284646 A1  11/2008 Walley et al.
2010/0019969 A1  1/2010 Zhou
(Continued)

FOREIGN PATENT DOCUMENTS

CN    1538190 A    10/2004
CN  101646920 A     2/2010
(Continued)

OTHER PUBLICATIONS

Qu, W., et al., "Localization Technology Based on the RSSI for Wireless Sensor Networks," Journal of Northeastern University (Natural Science), vol. 30, No. 5, May 2009, 5 pages.
(Continued)

*Primary Examiner* — Jean A Gelin
(74) *Attorney, Agent, or Firm* — Conley Rose, P.C.

(57) ABSTRACT

This application discloses a positioning method and an apparatus, and relates to the field of communications technologies. The positioning method and the apparatus are invented to resolve a prior-art problem of a relatively low success rate of obtaining an assisted location. The method includes: determining, by a terminal, identifiers of M target signal sources, where a value of M is an integer greater than 1, and the target signal source is a signal source whose signal strength currently can be detected by the terminal and is greater than a preset threshold; obtaining, based on the identifiers of the M target signal sources, a location matching the identifiers of the M target signal sources; and performing, by the terminal, satellite positioning based on the location. This application is applied to a satellite positioning process.

20 Claims, 11 Drawing Sheets

(58) Field of Classification Search
CPC ... H04W 48/10; H04W 64/003; G01S 19/256; G01S 19/26; G01S 19/46; G01S 19/25; G01S 19/28; H04H 2201/13; H04H 60/44; H04H 60/60751
See application file for complete search history.

(56) References Cited

U.S. PATENT DOCUMENTS

| | | | | |
|---|---|---|---|---|
| 2010/0149029 | A1* | 6/2010 | Camp, Jr. | G01S 19/258 342/357.31 |
| 2012/0289243 | A1 | 11/2012 | Tarlow et al. | |
| 2012/0322465 | A1* | 12/2012 | Huang | H04W 48/18 455/456.6 |
| 2013/0132957 | A1* | 5/2013 | Chen | G06F 12/08 718/1 |
| 2013/0234894 | A1 | 9/2013 | Oka et al. | |
| 2014/0210663 | A1* | 7/2014 | Metzler | G01S 19/51 342/357.34 |
| 2016/0135167 | A1 | 5/2016 | Dong et al. | |
| 2017/0045620 | A1 | 2/2017 | Wang et al. | |
| 2019/0132815 | A1* | 5/2019 | Zampini, II | G06Q 50/06 |
| 2019/0391980 | A1* | 12/2019 | Mundar | H04L 63/0807 |

FOREIGN PATENT DOCUMENTS

| | | |
|---|---|---|
| CN | 101765201 A | 6/2010 |
| CN | 102064895 A | 5/2011 |
| CN | 102111872 A | 6/2011 |
| CN | 102223597 A | 10/2011 |
| CN | 102236098 A | 11/2011 |
| CN | 102610000 A | 7/2012 |
| CN | 102778685 A | 11/2012 |
| CN | 102932911 A | 2/2013 |
| CN | 103249143 A | 8/2013 |
| CN | 103458504 A | 12/2013 |
| CN | 103796163 A | 5/2014 |
| CN | 103901398 A | 7/2014 |
| CN | 103974189 A | 8/2014 |
| CN | 104007417 A | 8/2014 |
| CN | 104243662 A | 12/2014 |
| CN | 105376712 A | 3/2016 |
| CN | 105629281 A | 6/2016 |
| CN | 106019218 A | 10/2016 |
| CN | 106324642 A | 1/2017 |
| EP | 1437014 B1 | 11/2008 |
| EP | 2579065 A1 | 4/2013 |
| WO | 9631076 A1 | 10/1996 |
| WO | 2010071685 A1 | 6/2010 |
| WO | 2014114204 A1 | 7/2014 |

OTHER PUBLICATIONS

Machine Translation and Abstract of Chinese Publication No. CN101765201, Jun. 30, 2010, 19 pages.
Machine Translation and Abstract of Chinese Publication No. CN102223597, Oct. 19, 2011, 24 pages.
Machine Translation and Abstract of Chinese Publication No. CN103901398, Jul. 2, 2014, 10 pages.
Machine Translation and Abstract of Chinese Publication No. CN103974189, Aug. 6, 2014, 21 pages.
Machine Translation and Abstract of Chinese Publication No. CN105629281, Jun. 1, 2016, 21 pages.
Foreign Communication From a Counterpart Application, PCT Application No. PCT/CN2017/081727, English Translation of International Search Report dated Jan. 10, 2018, 3 pages.
Foreign Communication From a Counterpart Application, PCT Application No. PCT/CN2017/081727, English Translation of Written Opinion dated Jan. 10, 2018, 3 pages.

\* cited by examiner

POSITIONING METHOD AND APPARATUS

CROSS-REFERENCE TO RELATED APPLICATIONS

This application is a National Stage of International Patent Application No. PCT/CN2017/081727 filed on Apr. 24, 2017, which claims priority to Chinese Patent Application No. 201710222015.6, filed on Apr. 6, 2017, both of which are hereby incorporated by reference in their entireties.

TECHNICAL FIELD

This application relates to the field of communications technologies, and in particular, to a positioning method and an apparatus.

BACKGROUND

A location based service (Location Based Service, LBS) is a value-added service for obtaining location information (such as geographic coordinates) of a terminal user by using various positioning technologies, and providing a corresponding service to the user with support of a geographic information system (Geographic Information System, GIS) platform. As the location based service is more widely applied, the user also has an increasingly high positioning requirement. A Global Positioning System (Global Positioning System, GPS) is used as a common positioning technology, and a GPS time to first fix (Time to First Fix, TTFF) is a key factor affecting positioning. The GPS time to first fix is a time required by a terminal having a GPS positioning function from starting of GPS positioning to successful positioning.

To reduce the GPS time to first fix, at present, a widely used positioning method includes: obtaining, by a terminal, an assisted location, and searching for and tracking a satellite based on the obtained assisted location, to accomplish first positioning. In the prior art, a method for obtaining an assisted location includes: prestoring, by a terminal, a mapping relationship among a cell identifier, a location, and location frequency; and during positioning, obtaining, by the terminal, an identifier of a cell with which the terminal currently registers, searching the prestored mapping relationship based on the cell identifier, to obtain all locations corresponding to the cell with which a user currently registers, and using a location that appears most frequently in all the locations, as an assisted location. However, an error may occur in such an implementation in the following cases. Consequently, an assisted location cannot be obtained.

As shown in FIG. 1a, a physical distance between P and Q is short (within a range of several kilometers), but P and Q respectively correspond to different cells with which registration is performed. For example, a cell with which registration is performed and that corresponds to P is a cell A, and a cell with which registration is performed and that corresponds to Q is a cell B. When a terminal stores only a mapping relationship between the cell A and a location at P (for ease of description, the location at P is referred to as a location P), when the terminal moves to Q and requires GPS positioning, because the terminal obtains an identifier of the cell B, and fails to find a mapping relationship corresponding to the cell B, a location assistance function cannot be accomplished. Actually, at Q, the location P can be used as an assisted location to assist positioning by the terminal.

As shown in FIG. 1b, an area P is a cross coverage area of a cell A and a cell B. Therefore, when a terminal is in the area P, the terminal may register with different cells at different time. At a moment T1, the terminal registers with a cell A, and pre-obtains a location P of the terminal, so that the terminal stores a mapping relationship between the cell A and the location P at P; and at a moment T2, when the terminal is located at P again and requires GPS positioning, an identifier, obtained by the terminal, of a cell with which registration is currently performed is an identifier of the cell B. Because a mapping relationship corresponding to the cell B is not found, a location assistance function cannot be accomplished. Actually, the mapping relationship between the cell A and the location at P established during registration with the cell A can be used as location assistance information and provided for assisting positioning by the terminal.

SUMMARY

Embodiments of this application provide a positioning method and an apparatus, to resolve a prior-art problem of a relatively low success rate of providing an assisted location.

To achieve the foregoing objective, the following technical solutions are used in the embodiments of this application.

According to a first aspect, a positioning method is provided. The method is applicable to a scenario in which satellite positioning is performed, and the method includes: determining, by a terminal, identifiers of M target signal sources, where a value of M is an integer greater than 1, and the target signal source is a signal source whose signal strength currently can be detected by the terminal and is greater than a preset threshold; then, obtaining, by the terminal based on the identifiers of the M target signal sources, a location matching the identifiers of the M target signal sources; and further, using, by the terminal, the location as an assisted location, and performing satellite positioning based on the location.

The signal source in an embodiment of this application is a base station that can be detected by the terminal or an access point such as a wireless router that can be detected by the terminal. A value of the preset threshold may be set according to an actual requirement.

It can be learned that, in the foregoing method, when determining the assisted location, the terminal considers a plurality of signal sources that currently can be detected, where the plurality of signal sources may be signal sources currently accessed by the terminal, or may be signal sources neighboring to a currently accessed signal source, so that when the assisted location is determined, if the assisted location fails to be obtained based only on the currently accessed signal source, refer to a location corresponding to a neighboring signal source. For example, the location corresponding to the neighboring signal source is determined as the assisted location. Therefore, according to the foregoing method, a success rate of obtaining the assisted location can be improved.

In a possible design, the obtaining, by the terminal based on the identifiers of the M target signal sources, a location matching the identifiers of the M target signal sources includes: determining, by the terminal, a current signal source integrated identifier based on the identifiers of the M target signal sources, where the current signal source integrated identifier consists of the identifiers of the M target signal sources; further, determining, by the terminal, a target signal source integrated identifier matching the current signal source integrated identifier, and a location corresponding to the target signal source integrated identifier; and determining the location corresponding to the target signal source integrated identifier as the location matching the identifiers of the M target signal sources, namely, a current assisted location of the terminal, and performing positioning based on the current assisted location.

The determining, by the terminal, a current signal source integrated identifier includes: sequentially arranging, by the terminal, the identifiers of the M target signal sources based on signal strengths of the signal sources, and then generating the current signal source integrated identifier.

The preset threshold may be set according to an actual requirement. For the current signal source integrated identifier, a set consisting of the identifiers of the M target signal sources may be used as a signal source integrated identifier, the identifier of each of the M target signal sources is an element in the set, and the elements in the set may be sequentially arranged based on the signal strengths, for example, arranged based on a descending order or an ascending order of the signal strengths.

It can be learned that, in the foregoing method, when the assisted location is determined, the current signal source integrated identifier is determined first, and then, the location corresponding to the target signal source integrated identifier that can match the current signal source integrated identifier is determined as the current assisted location; and positioning is performed based on the current assisted location. The assisted location is determined based on the signal source integrated identifier, and the signal source integrated identifier consists of the identifiers of the M signal sources whose signal strengths can be detected by the terminal and are greater than the preset threshold. Therefore, the signal source integrated identifier can reflect a relationship between the terminal and coverage of the plurality of signal sources, and indicates that the terminal may be located within the coverage of the plurality of signal sources. In this way, when the assisted location is determined, compared with the prior art in which only a cell with which a terminal registers is considered, in the method provided in this embodiment of this application, the plurality of signal sources are comprehensively considered, so that a location corresponding to another signal source, for example, a location corresponding to a neighboring cell of the terminal, can be determined as the assisted location, thereby improving the success rate of obtaining the assisted location by the terminal.

In a possible design, the terminal locally stores a mapping relationship between a signal source integrated identifier and a location; and the terminal searches the stored mapping relationship for the target signal source integrated identifier whose similarity to the current signal source integrated identifier satisfies a preset condition, and the location corresponding to the target signal source integrated identifier, and uses the location as the location matching the identifiers of the M target signal sources, namely, the current assisted location of the terminal.

In the implementation, the terminal locally prestores the mapping relationship between a signal source integrated identifier and a location. Therefore, the terminal does not need to interact with a network side or another device, and even if in a non-networked state, after determining the current signal source integrated identifier, the terminal searches the stored mapping relationship, to determine a location corresponding to a signal source integrated identifier similar to the current signal source integrated identifier as the assisted location.

In a possible design, the preset condition in this embodiment of this application includes: the target signal source integrated identifier is a signal source integrated identifier including at least N same signal source identifiers as the current signal source integrated identifier. A value of N is an integer greater than or equal to 1 and less than or equal to M.

When there are at least two signal source integrated identifiers each including at least N same signal source identifiers as the current signal source integrated identifier, the preset condition further includes: the target signal source integrated identifier is a signal source integrated identifier that includes the largest quantity of same signal source identifiers as the current signal source integrated identifier, where the signal source integrated identifier is in the at least two signal source integrated identifiers.

In a possible design, the terminal further stores an establishment time of the mapping relationship between a signal source integrated identifier and a location; and when there are at least two signal source integrated identifiers each including at least N same signal source identifiers as the current signal source integrated identifier, the preset condition further includes: the target signal source integrated identifier is a signal source integrated identifier with the latest establishment time of the mapping relationship, where the signal source integrated identifier is in the at least two signal source integrated identifiers.

In a possible design, after the performing, by the terminal, satellite positioning based on the current assisted location, the method further includes: determining, by the terminal, whether a mapping relationship corresponding to the current signal source integrated identifier is locally stored; and if yes, updating, by the terminal to a location corresponding to the current signal source integrated identifier, a current location of the terminal obtained after the satellite positioning; or if not, storing, by the terminal, a mapping relationship between the current signal source integrated identifier and a. current location of the terminal obtained after the satellite positioning. According to the design manner, the terminal can update the mapping relationship between a signal source integrated identifier and a location in real time during the satellite positioning.

With reference to the foregoing possible design manners, in a possible design, another implementation of the obtaining, by the terminal, a location matching the identifiers of the M signal sources includes: sending, by the terminal, a current signal source integrated identifier to a network device, determining, by the network device based on the current signal source integrated identifier, a target signal source integrated identifier whose similarity to the current signal source integrated identifier satisfies a preset condition, and a location corresponding to the target signal source integrated identifier; and sending, by the network device, the target signal source integrated identifier and the location corresponding to the target signal source integrated identifier to the terminal.

The network device may be a network positioning server, or a device located on a core network side. In the implementation, the network device stores the mapping relationship between a signal source integrated identifier and a location. The network device determines, based on the current signal source integrated identifier by searching the stored mapping relationship, the target signal source integrated identifier and the location corresponding to the target signal source integrated identifier, and sends the target signal source integrated identifier and the location corresponding to the target signal source integrated identifier to the terminal. For a specific implementation of determining, by the network side device, the target signal source integrated identifier, refer to the foregoing possible designs in which the terminal determines the target signal source integrated identifier. According to the implementation, the network side device undertakes a processing process of determining the target signal source integrated identifier, thereby saving memory of the terminal, and reducing occupation of resources of the terminal.

According to a second aspect, a terminal is provided. The terminal includes: a determining unit, configured to determine identifiers of M target signal sources, where a value of M is an integer greater than 1, and the target signal source is a signal source whose signal strength currently can be detected by the terminal and is greater than a preset threshold; an obtaining unit, configured to obtain, based on the identifiers of the M target signal sources determined by the determining unit, a location matching the identifiers of the M target signal sources; and a positioning unit, configured to perform satellite positioning based on the location obtained by the obtaining unit.

In a possible design, the determining unit is specifically configured to determine a current signal source integrated identifier, where the current signal source integrated identifier consists of the identifiers of the M target signal sources; and the obtaining unit is specifically configured to: obtain a target signal source integrated identifier matching the current signal source integrated identifier determined by the determining unit, and a location corresponding to the target signal source integrated identifier; and determine the location corresponding to the target signal source integrated identifier as the location matching the identifiers of the M target signal sources.

In a possible design, the determining unit is further configured to: sequentially arrange the identifiers of the M target signal sources based on signal strengths of the signal sources, and then generate the current signal source integrated identifier.

In a possible design, the terminal further includes a storage unit, configured to store a mapping relationship between a signal source integrated identifier and a location; and the obtaining unit is further configured to search the mapping relationship stored by the storage unit for the target signal source integrated identifier whose similarity to the current signal source integrated identifier satisfies a preset condition, and the location corresponding to the target signal source integrated identifier.

In a possible design, the preset condition includes: the target signal source integrated identifier is a signal source integrated identifier including at least N same signal source identifiers as the current signal source integrated identifier, where a value of N is an integer greater than or equal to 1 and less than or equal to M.

In a possible design, when there are at least two signal source integrated identifiers each including at least N same signal source identifiers as the current signal source integrated identifier, the preset condition further includes: the target signal source integrated identifier is a signal source integrated identifier that includes the largest quantity of same signal source identifiers as the current signal source integrated identifier, where the signal source integrated identifier is in the at least two signal source integrated identifiers.

In a possible design, the storage unit is further configured to store an establishment time of the mapping relationship between a signal source integrated identifier and a location; and when there are at least two signal source integrated identifiers each including at least N same signal source identifiers as the current signal source integrated identifier, the preset condition further includes: the target signal source integrated identifier is a signal source integrated identifier with the latest establishment time of the mapping relationship, where the signal source integrated identifier is in the at least two signal source integrated identifiers.

In a possible design, the determining unit is further configured to: determine whether a mapping relationship corresponding to the current signal source integrated identifier is locally stored; and if the mapping relationship corresponding to the current signal source integrated identifier is stored, update, to a location corresponding to the current signal source integrated identifier, a current location of the terminal obtained after the positioning by the positioning unit; or if the mapping relationship corresponding to the current signal source integrated identifier is not stored, the storage unit stores a mapping relationship between the current signal source integrated identifier and a current location of the terminal obtained after the positioning by the positioning unit.

According to a third aspect, a terminal is provided. The terminal includes a processor and a memory, where the memory stores an instruction, and the processor is configured to execute the instruction stored in the memory, to perform the method according to the foregoing aspect.

According to a fourth aspect, a computer-readable storage medium is provided. The computer-readable storage medium stores an instruction, and when the computer-readable storage medium is run on a computer, the computer is enabled to perform the method according to the foregoing aspect.

According to a fifth aspect, a computer program product is provided. The computer program product includes an instruction, and when the computer program product is run on a computer, the computer is enabled to perform the method according to the foregoing aspect.

DESCRIPTION OF EMBODIMENTS

In the embodiments of this application, the term "plurality" means two or more. In the embodiments of this application, the terms such as "first" and "second" are merely used to distinguish between different objects, and are not intended to limit a sequence thereof. For example, a first condition and a second condition are merely used to distinguish between different conditions, and are not intended to limit a sequence thereof. In the embodiments of this application, the term "and/or" describes only an association relationship for describing associated objects and represents that three relationships may exist. For example, A and/or B may represent the following three cases: Only A exists, both A and B exist, and only B exists. In addition, in the embodiments of this application, the character "/" generally indicates an "or" relationship between the associated objects.

Figure 2A:
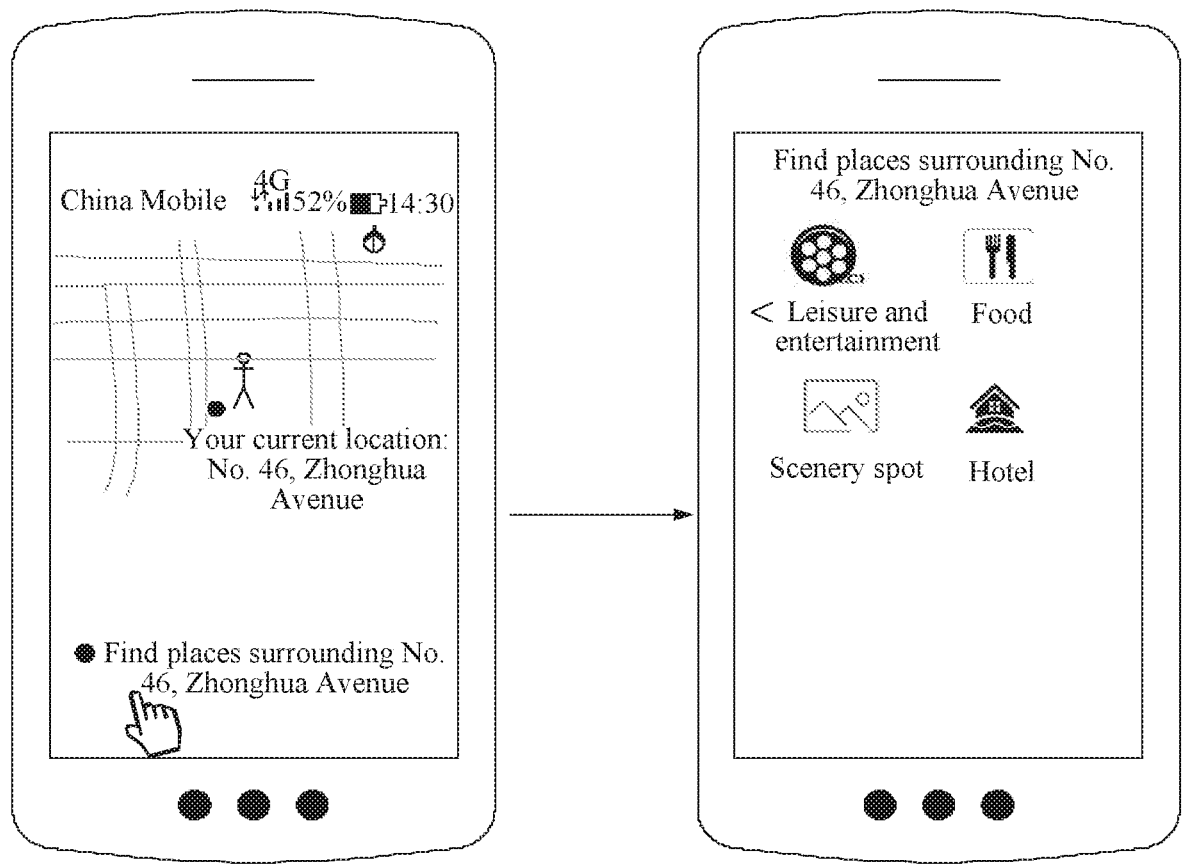
FIG. 2a is a schematic diagram of an application scenario according to an embodiment of this application.

At present, during use of a terminal by a user, a location based service is more widely applied. As shown in FIG. 2a, a current geographical location of the terminal is determined first, and then names and addresses of a hotel, a cinema, a library, a gas station, and the like within a particular range from the location are provided for the user. Various positioning technologies are used in these location based services. Therefore, the user also has an increasingly high positioning requirement. A positioning speed is a key factor affecting positioning. At present, common positioning technologies in which positioning is performed by using a satellite system include: Beidou positioning, GPS positioning, Galileo positioning, a Global Navigation Satellite System (Global Navigation Satellite System, GLONASS), and the like. To increase the positioning speed, an embodiment of this application provides a positioning method, mainly applied to a process in which a terminal performs positioning by using a satellite system.

The terminal in the embodiments of this application can perform positioning by using a satellite system. The terminal may be a device such as a mobile phone, a tablet computer, a notebook computer, an ultra-mobile personal computer (Ultra-mobile Personal Computer, UMPC), a netbook, a personal digital assistant (Personal Digital Assistant, PDA), an in-vehicle navigator, or a wearable device.

Figure 2B:
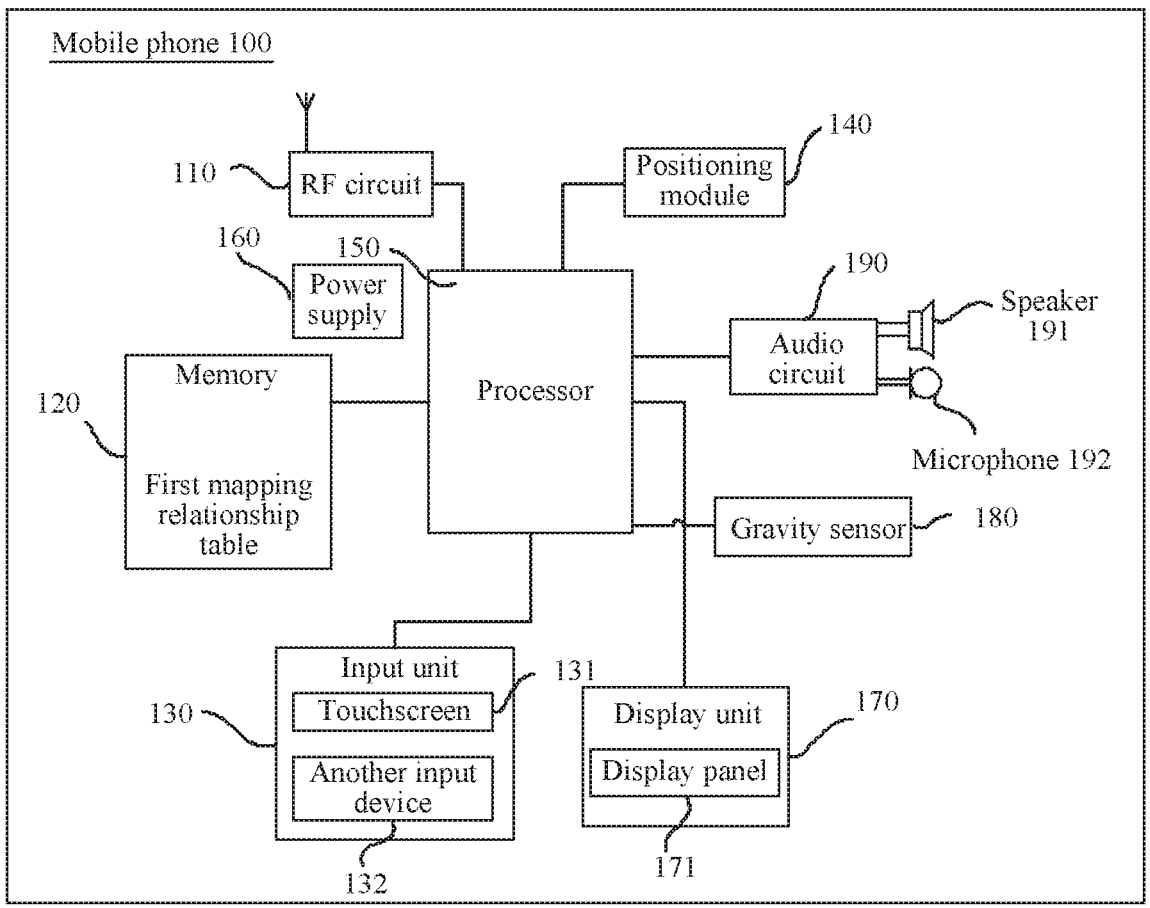
FIG. 2b is a schematic structural diagram of a mobile phone according to an embodiment of this application.

Using an example in which the terminal is a mobile phone, as shown in FIG. 2b, the mobile phone 100 includes components such as a radio frequency (radio frequency, RF) circuit 110, a memory 120, an input unit 130, a positioning module 140, a processor 150, a power supply 160, a display unit 170, a gravity sensor 180, and an audio circuit 190. A person skilled in the art may understand that a structure of the mobile phone shown in FIG. 2b does not constitute a limitation to the mobile phone, and the mobile phone may include more or fewer components than those shown in the figure, or some components may be combined, or different component arrangements may be used.

Functional components of the mobile phone 100 are separately described below:

The RF circuit 110 may be configured to receive and send signals in an information receiving and sending process or a call process. Particularly, the RF circuit 110 receives downlink information from a base station, then delivers the downlink information to the processor 150 for processing, and additionally sends uplink data to the base station. Generally, the RF circuit includes, but is not limited to: an antenna, at least one amplifier, a transceiver, a coupler, a low noise amplifier (low noise amplifier, LNA), a duplexer, and the like. In addition, the RF circuit 110 may communicate with a network and another device by wireless communication. The wireless communication may use any communication standard or protocol, including, but not limited to, a Global System for Mobile Communications (global system of mobile communication, GSM), a general packet radio service (general packet radio service, GPRS), Code Division Multiple Access (code division multiple access, CDMA), Wideband Code Division Multiple Access (wideband code division multiple access, WCDMA), Long Term Evolution (long term evolution, LTE), an email, and a short messaging service (short messaging service, SMS).

The memory 120 may be configured to store a software program and module. The processor 150 runs the software program and module stored in the memory 120, to implement various functional applications and data processing of the mobile phone 100. The memory 120 may mainly include a program storage area and a data storage area. The program storage area may store an operating system, an application program (Application, APP) required by at least one function such as a sound playback function and an image display function. The data storage area may store data (such as audio data, image data, and an address book) created based on use of the mobile phone 100, and the like. In addition, the memory 120 may include a high speed random access memory, and may further include a non-volatile memory, such as at least one magnetic disk storage device, a flash memory, or another volatile solid-state storage device.

The input unit 130 may be configured to: receive entered digit or character information, and generate a key signal input related to a user setting and function control of the mobile phone 100. Specifically, the input unit 130 may include a touchscreen 131 and another input device 132. The touchscreen 131, which is also referred to as a touch panel, may collect a touch operation of a user on or near the touchscreen 131 (such as an operation of the user on or near the touchscreen 131 by using any suitable object or accessory such as a finger or a stylus), and drive a corresponding connection apparatus according to a preset program. Optionally, the touchscreen 131 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 150. Moreover, the touch controller can receive and execute a command sent from the processor 150. In addition, the touchscreen 131 may be implemented in various types such as a resistance type, a capacitance type, an infrared type, and a surface acoustic wave type. In addition to the touchscreen 131, the input unit 130 may include the another input device 132. Specifically, the another input device 132 may include, but is not limited to, one or more of a physical keyboard, a functional key (such as a volume control key or a switch key), a trackball, a mouse, or a joystick.

The positioning module 140 is a module having a positioning function, and may be a Beidou positioning module, a GPS positioning module, a Galileo positioning module, or a Global Navigation Satellite System (Global Navigation Satellite System, GLONASS) module. The positioning module may be integrally packaged or may be an independent chip. The mobile phone 100 may perform positioning by using the positioning module 140.

The display unit 170 may be configured to display information entered by the user or information provided for the user, and various menus of the mobile phone 100. The display unit 170 may include a display panel 171. Optionally, the display panel 171 may be configured by using a liquid crystal display (Liquid Crystal Display, LCD), an organic light-emitting diode (Organic Light-Emitting Diode, OLED), or the like. Further, the touchscreen 131 may cover the display panel 171. After detecting a touch operation on or near the touchscreen 131, the touchscreen 131 transfers the touch operation to the processor 150, to determine a type of a touch event. Then, the processor 150 provides a corresponding visual output on the display panel 171 based on the type of the touch event. Although, in FIG. 2b, the touchscreen 131 and the display panel 171 are used as two separate parts to implement input and output functions of the mobile phone 100, in some embodiments, the touchscreen 131 and the display panel 171 may be integrated to implement the input and output functions of the mobile phone 100.

The gravity sensor (gravity sensor) 180 may detect magnitude of acceleration of the mobile phone in various directions (which are generally tri-axial), may detect magnitude and a direction of gravity when the mobile phone is static, and may be used for an application that identifies a mobile phone gesture (for example, switching between a horizontal screen and a vertical screen, a related game, and magnetometer gesture calibration), a function related to vibration identification (for example, a pedometer and a knock), and the like.

The mobile phone 100 may further include another sensor, for example, an optical sensor. Specifically, the optical sensor may include an ambient light sensor and an optical proximity sensor. The ambient light sensor may adjust brightness of the display panel 131 based on brightness of ambient light. The optical proximity sensor may detect whether there is an object approaching or touching the mobile phone, and may turn off the display panel 131 and/or backlight when the mobile phone 100 is moved to an ear. Another sensor such as a gyroscope, a barometer, a hygrometer, a thermometer, or an infrared sensor may further be configured in the mobile phone 100. Details are not described herein.

The audio circuit 190, a speaker 191, and a microphone 192 may provide an audio interface between a user and the mobile phone 100. The audio circuit 190 may convert received audio data into an electrical signal and transmit the electrical signal to the speaker 191. The speaker 191 converts the electrical signal into a sound signal for output. In addition, the microphone 192 converts a collected sound signal into an electrical signal. The audio circuit 190 receives the electrical signal, converts the electrical signal into audio data, and outputs the audio data to the RF circuit 110 to send the audio data to, for example, another mobile phone, or outputs the audio data to the memory 120 for further processing, The processor 150 is a control center of the mobile phone 100, and is connected to various parts of the mobile phone by using various interfaces and lines. By running or executing the software program and/or the module stored in the memory 120, and invoking data stored in the memory 120, the processor 150 performs various functions and data processing of the mobile phone 100, thereby performing overall monitoring on the mobile phone. Optionally, the processor 150 may include one or more processing units. Optionally, the processor 150 may integrate an application processor and a modem processor. The application processor mainly processes an operating system, a user interface, an application program, and the like. The modem processor mainly processes wireless communication. It may be understood that the foregoing modem processor may alternatively not be integrated into the processor 150.

The mobile phone 100 further includes the power supply 160 (such as a battery) for supplying power to the components. Optionally, the power supply may be logically connected to the processor 150 by using a power management system, thereby implementing functions such as charging, discharging and power consumption management by using the power management system.

Although not shown in the figure, the mobile phone 100 may further include an antenna, a Wireless Fidelity (Wireless-Fidelity, Wi-Fi) module, a Near Field Communication (Near Field Communication, NFC) module, a Bluetooth module, a speaker, an accelerometer, a gyroscope, and the like.

Figure 3A:
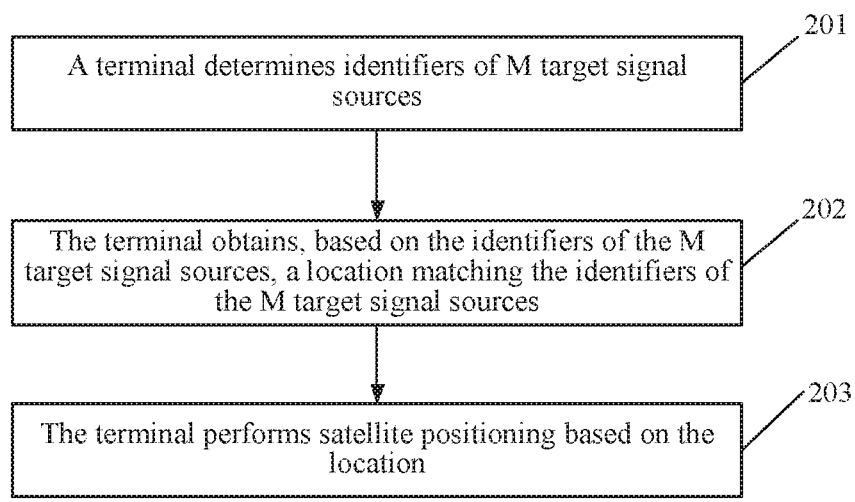
FIG. 3a is a flowchart of a positioning method according to an embodiment of this application.

An embodiment of this application provides a positioning method, applicable to the foregoing application scenario and terminal, and especially applicable to a process of assisting satellite positioning during the satellite positioning, for example, applicable to assisted GPS (Assisted GPS, A-GPS) positioning. As shown in FIG. 3a, the method includes the following steps.

Step 201: The terminal determines identifiers of M target signal sources.

The signal source in this embodiment of this application may be a base station, a cellular cell (cell), and other types of access points (Access Point, AP) such as a wireless routing device and a device as a hotspot. A value of M is an integer greater than 1, and the target signal source is a signal source whose signal strength currently can be detected by the terminal and is greater than a preset threshold. The preset threshold may be set according to an actual requirement.

Step 202: The terminal obtains, based on the identifiers of the M target signal sources, a location matching the identifiers of the M target signal sources.

The location is an assisted location used to assist satellite positioning.

Step 203: The terminal performs satellite positioning based on the location.

Optionally, the terminal may directly use the location obtained in step 202 as an ultimate satellite positioning result.

Optionally, after determining the assisted location, the terminal may rapidly track a satellite by using the assisted location, to implement positioning. For the specific implementation process, refer to the prior art, and details are not described in this embodiment of this application.

It can be learned that, in the foregoing method, when determining the assisted location, the terminal considers a plurality of signal sources that currently can be detected, where the plurality of signal sources may be signal sources currently accessed by the terminal, or may be signal sources neighboring to a currently accessed signal source, so that when the assisted location is determined, if the assisted location fails to be obtained based only on the currently accessed signal source, refer to a location corresponding to a neighboring signal source. For example, the location corresponding to the neighboring signal source is determined as the assisted location. Therefore, according to the foregoing method, a success rate of obtaining the assisted location can be improved.

Figure 3B:
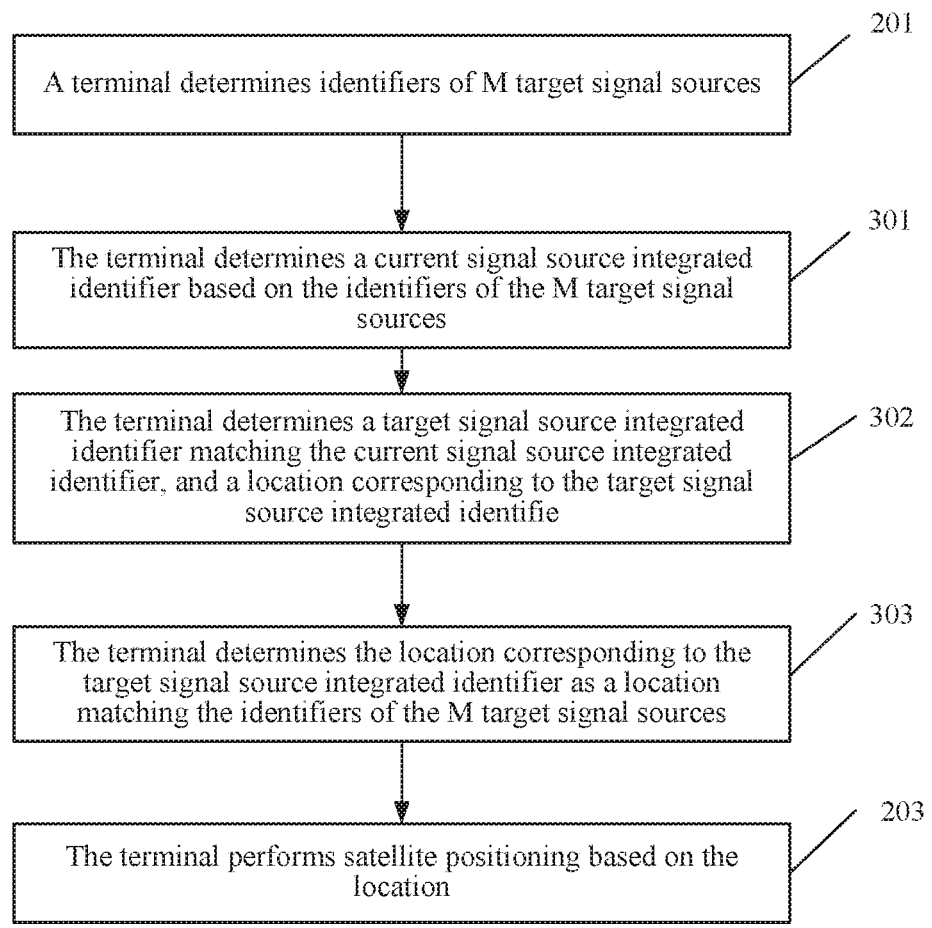
FIG. 3b is a flowchart of another positioning method according to an embodiment of this application.

Optionally, this embodiment of this application provides a possible implementation of step 202 of "obtaining, by the terminal based on the identifiers of the M target signal sources, a location matching the identifiers of the M target signal sources". As shown in FIG. 3b, the method includes the following steps.

Step 301: The terminal determines a current signal source integrated identifier based on the identifiers of the M target signal sources.

The current signal source integrated identifier consists of the identifiers of the M target signal sources.

For example, the signal source integrated identifier is indicated in a form of a one-dimensional matrix (set) consisting of the identifiers of the M target signal sources, and elements in the set may be randomly arranged or may be sequentially arranged based on signal strengths. For example, the current signal source integrated identifier is $[ID_A\ ID_B\ ID_C\ ID_D]$, where $ID_A$, $ID_B$, $ID_C$, and $ID_D$ respectively indicate identifiers of cells A, B, C, and D, and a descending order of signal strengths is: A>B>C>D. The current signal source integrated identifier may alternatively be indicated in another form, for example, $ID_A$-$ID_C$-$ID_B$-$ID_D$.

Step 302: The terminal determines a target signal source integrated identifier matching the current signal source integrated identifier, and a location corresponding to the target signal source integrated identifier.

Information about the location corresponding to the target signal source integrated identifier is latitude and longitude information. A mapping relationship between a signal source integrated identifier and location information is pre-established. Optionally, the pre-established mapping relationship may exist in a form of a mapping relationship table. Optionally, the mapping relationship table may be locally stored in the terminal, so that when performing the step, the terminal searches the locally stored mapping relationship table for the target signal source integrated identifier and the location corresponding to the target signal source integrated identifier. In the implementation, when determining the target signal source integrated identifier and the location corresponding to the target signal source integrated identifier, the terminal does not need to interact with another device, to be specific, does not depend on a network connection. In a non-networked state, the terminal can still obtain through matching the target signal source integrated identifier and the information about the location corresponding to the target signal source integrated identifier.

Optionally, the mapping relationship table may be stored in a network device. The network device may be a network positioning server or a core network side device, so that when performing the step, the terminal sends the current signal source integrated identifier to the network device, and the network device obtains through matching the target signal source integrated identifier and the location corresponding to the target signal source integrated identifier Optionally, in a possible implementation, the terminal determines a signal source integrated identifier whose similarity to the current signal source integrated identifier satisfies a preset condition as the target signal source integrated identifier, That a similarity to the current signal source integrated identifier satisfies a preset condition includes: the target signal source integrated identifier and the current signal source integrated identifier include at least N same signal source identifiers. A value of N may be greater than or equal to 1 and less than or equal to M. For the specific implementation, refer to detailed descriptions below.

In another implementation, in a special case, the current signal source integrated identifier determined in step 301 includes only one signal source identifier, for example, an identifier of a cell with which the terminal currently registers or an identifier of an access point currently accessed by the terminal, so that the target signal source integrated identifier matching the current signal source integrated identifier in step 302 may be an identifier of a neighboring signal source, for example, an identifier of a neighboring cell with which registration is not performed but whose signal strength can be detected and is relatively high or an identifier of an access point that is not accessed but whose signal strength can be detected and is relatively high. For example, if the current signal source integrated identifier includes only one signal source identifier, for example, the identifier $ID_A$ of the cell A, when the target signal source integrated identifier is obtained through matching, an identifier that does not include the cell A but includes a cell that is a neighboring, cell of the cell A and has a relatively high signal strength (the signal strength is greater than a particular threshold) is used as the target signal source integrated identifier through matching. For example, the identifier $ID_B$ of the cell B is determined as the target signal source integrated identifier.

Step 303: The terminal determines the location corresponding to the target signal source integrated identifier as the location matching the identifiers of the M target signal sources.

To be specific, the location corresponding to the target signal source integrated identifier is determined as a current assisted location of the terminal.

According to the foregoing method, when the assisted location is determined, the current signal source integrated identifier is determined first, and then, the location corresponding to the target signal source integrated identifier that can match the current signal source integrated identifier is determined as the current assisted location and positioning is performed based on the current assisted location. The assisted location is determined based on the signal source integrated identifier, and the signal source integrated identifier consists of the identifiers of the M signal sources whose signal strengths can be detected by the terminal and are greater than the preset threshold. Therefore, the signal source integrated identifier can reflect a relationship between the terminal and coverage of the plurality of signal sources, and indicates that the terminal may be located within the coverage of the plurality of signal sources. In this way, when the assisted location is determined, compared with the prior art in which only a cell with which a terminal registers is considered, in the method provided in this embodiment of this application, the plurality of signal sources are comprehensively considered, so that a location corresponding to another signal source, for example, a location corresponding to a neighboring cell of the terminal, can be determined as the assisted location, thereby improving the success rate of obtaining the assisted location by the terminal.

Figure 4A:
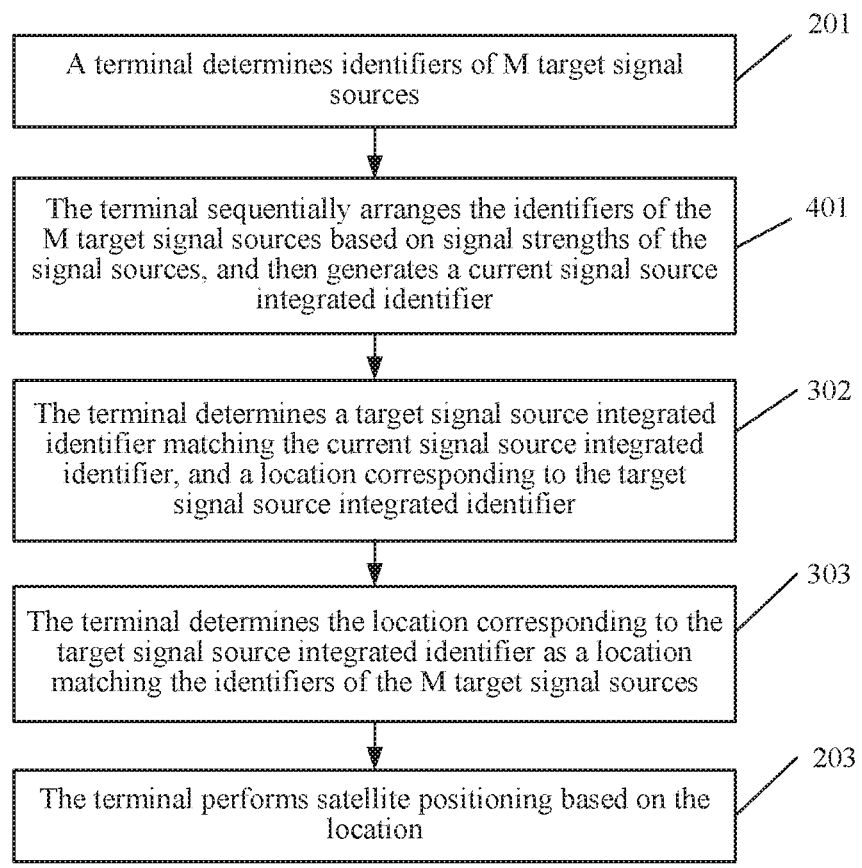
FIG. 4a is a flowchart of a method for determining a current signal source integrated identifier according to an embodiment of this application.

Optionally, as shown in FIG. 4a, an implementation of step 301 of "determining, by the terminal, a current signal source integrated identifier based on the identifiers of the M target signal sources" includes the following steps.

Step 401: The terminal sequentially arranges the identifiers of the M target signal sources based on signal strengths of the signal sources, and then generates the current signal source integrated identifier.

For example, when a signal source is a cell that can be detected by the terminal, it is assumed that the terminal can detect seven cells: A, B, C, D, E, F, and G, and signal strengths of the seven cells are shown in the following Table 1. Therefore, the M target signal sources in this embodiment of this application may be several or all of the seven cells, to be specific, the value of M is greater than or equal to 1 and less than or equal to 7. Using an example in which the value of M is 4, four cells having higher signal strengths in the seven cells are respectively the cells A, C, B, and D, and identifiers corresponding to the cells are respectively $ID_A$, $ID_C$, $ID_B$, and $ID_D$. Therefore, the signal source integrated identifier in this embodiment of this application may be obtained after the identifiers of the four cells are arranged according to a particular rule, for example, obtained based on the signal strengths of the four cells, and the determined current signal source integrated identifier is $ID_A$-$ID_C$-$ID_B$-$ID_D$.

It should be noted that, the terminal may obtain the signal identifier and the signal strength of each cell through routing and paging in a cell or update of a positioned area or by using another method. For the specific implementation, refer to the prior art, and details are not described herein.

TABLE 1

| Cell identifier | Signal strength (dBm) |
|---|---|
| $ID_A$ | −55 |
| $ID_B$ | −65 |
| $ID_C$ | −57 |
| $ID_D$ | −73 |
| $ID_E$ | −90 |
| $ID_F$ | −100 |
| $ID_G$ | −87 |

For example, when a signal source is an access point (Access Point, AP) that can be detected by the terminal, for example, when the signal source is a wireless router used by the terminal to establish a Wi-Fi (Wireless-Fidelity, Wireless Fidelity) connection, it is assumed that the terminal can detect six wireless routers: R1, R2, R3, R4, R5, and R6, and signal strengths of the six wireless routers are shown in the following Table 2. Therefore, the M target signal sources in this embodiment of this application may be several or all of the six wireless routers, to be specific, the value of M is greater than or equal to 1 and less than or equal to 6. Using an example in which the value of M is 3, based on the signal strengths of the six wireless routers, the three target signal sources are three wireless routers having highest signal strengths, for example, the wireless routers 2, 1, and 3. Assuming that basic service set identifiers (Basic Service Set Identifier, BSSID) corresponding to the wireless routers 2, 1, and 3 are respectively $BSSID_{R2}$, $BSSID_{R1}$, and $BSSID_{R3}$, the signal source integrated identifier in this embodiment of this application may be obtained after the identifiers of the three wireless access points are arranged according to a particular rule, for example, obtained based on the signal strengths of the three wireless access points, and the signal source integrated identifier in this embodiment of this application is $BSSIID_{R2}$-$BSSID_{R1}$-$BSSID_{R3}$.

TABLE 2

| Wireless access point identifier | Signal strength (dBm) |
|---|---|
| $BSSID_{R1}$ | −69 |
| $BSSID_{R2}$ | −63 |
| $BSSID_{R3}$ | −72 |
| $BSSID_{R4}$ | −79 |
| $BSSID_{R5}$ | −82 |
| $BSSID_{R6}$ | −87 |
| $BSSID_{R7}$ | −95 |

It should be noted that, the identifier of the wireless router is described by using an example in Which the identifier is a BSSID. In another implementation, the identifier of the wireless router may alternatively be a service set identifier (Service Set Identifier, SSID).

In another implementation, when the terminal can detect signal strengths of a plurality of different types of signal sources, for example, can detect not only signal strengths of a plurality of cells but also signal strengths of a plurality of wireless routers, in addition to maintaining two different types of mapping relationships, the terminal may maintain a mapping relationship including both a cell identifier and a wireless router identifier. In this case, the signal source integrated identifier may include both a cell identifier and a wireless router identifier. For example, the signal source integrated identifier is $ID_A$-$ID_C$-$BSSID_{R2}$-$ID_B$-$BSSID_{R1}$-$BSSID_{R3}$-$ID_D$.

Optionally, the terminal locally stores a mapping relationship between a signal source integrated identifier and a location.

Figure 4B:
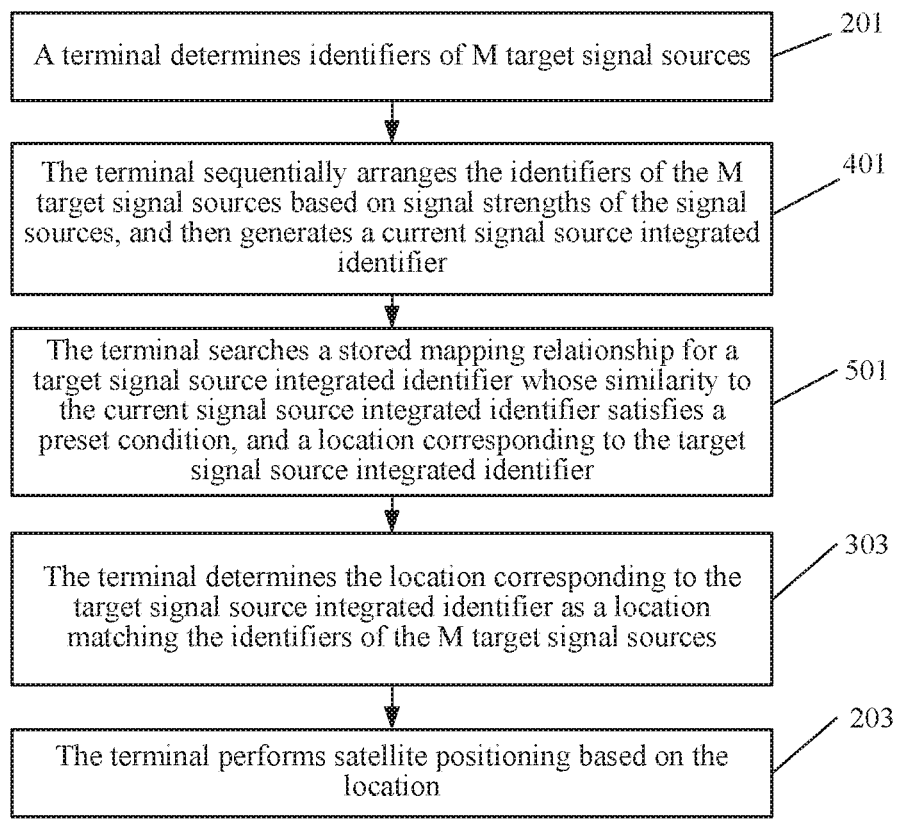
FIG. 4b is a flowchart of a method for determining a target signal source integrated identifier matching a current signal source integrated identifier according to an embodiment of this application.

Therefore, as shown in FIG. 4b, step 302 of "determining, by the terminal, a target signal source integrated identifier matching the current signal source integrated identifier, and a location corresponding to the target signal source integrated identifier" may be specifically implemented as follows:

Step 501: The terminal searches a stored mapping relationship for the target signal source integrated identifier whose similarity to the current signal source integrated identifier satisfies a preset condition, and the location corresponding to the target signal source integrated identifier.

As shown in Table 3, when a signal source is a cell that can be detected by the terminal, this embodiment of this application provides an implementation of the mapping relationship. As shown in Table 4, when a signal source is a wireless access point that can be detected by the terminal, this embodiment of this application provides an implementation of the mapping relationship. The terminal may maintain both the two types of mapping relationships.

Optionally, as shown in Table 3 and Table 4, the mapping relationship table may further store a generation time of each mapping relationship.

TABLE 3

| Cell integrated identifier | Location | Generation time of a mapping relationship |
|---|---|---|
| $ID_A$-$ID_B$-$ID_D$ | X1 degrees north latitude, and Y1 degrees east longitude | 2017 Jan. 1, 09:58 |
| $ID_A$-$ID_B$-$ID_H$-$ID_J$ | X2 degrees north latitude, and Y2 degrees east longitude | 2017 Jan. 1, 16:35 |
| $ID_A$-$ID_B$-$ID_D$-$ID_J$ | X3 degrees north latitude, and Y3 degrees east longitude | 2017 Jan. 2, 06:45 |

TABLE 3-continued

| Cell integrated identifier | Location | Generation time of a mapping relationship |
|---|---|---|
| $ID_A$-$ID_B$-$ID_C$-$ID_J$ | X4 degrees north latitude, and Y5 degrees east longitude | 2017 Jan. 2, 07:58 |

TABLE 4

| Wireless access point integrated identifier | Location | Generation time of a mapping relationship |
|---|---|---|
| $BSSID_{R1}$-$BSSID_{R2}$-$BSSID_{R3}$ | X1 degrees north latitude, and Y1 degrees east longitude | 2017 Jan. 1, 09:58 |
| $BSSID_{R2}$-$BSSID_{R3}$ | X2 degrees north latitude, and Y2 degrees east longitude | 2017 Jan. 1, 16:35 |
| $BSSID_{R1}$-$BSSID_{R3}$-$BSSID_{R4}$ | X3 degrees north latitude, and Y3 degrees east longitude | 2017 Jan. 2, 06:45 |
| $BSSID_{R2}$-$BSSID_{R4}$-$BSSID_{R5}$ | X4 degrees north latitude, and Y5 degrees east longitude | 2017 Jan. 2, 07:58 |

The preset condition includes a first condition that the current signal source integrated identifier and the target signal source integrated identifier include at least N same signal source identifiers, where a value of N is an integer greater than or equal to 1 and less than or equal to M. The value of N may be set according to an actual case. For example, if the current signal source integrated identifier consists of four cell identifiers, the value of N may be an integer greater than or equal to 1 and less than or equal to 4. When the signal source integrated identifier consists of two cell identifiers, the value of N may be an integer greater than or equal to 1 and less than or equal to 2.

When a plurality of signal source integrated identifiers all satisfy the foregoing first condition, the preset condition may further include any one or more of the following conditions:

Second condition: A signal source integrated identifier that includes the largest quantity of same signal source identifiers as the current signal source integrated identifier is determined as the target signal source integrated identifier, where the signal source integrated identifier is in the foregoing plurality of signal source integrated identifiers satisfying the first condition.

For example, if the current signal source integrated identifier is $ID_A$-$ID_B$-$ID_C$-$ID_d$, assuming that the value of N is 2, and it is determined, by viewing the mapping table shown in Table 3, that there are two candidate signal source integrated identifiers, which are respectively $ID_A$-$ID_B$-$ID_H$-$ID_J$ and $ID_A$-$ID_B$-$ID_D$, satisfying the first condition, because $ID_A$-$ID_B$-$ID_D$ and the current signal source integrated identifier $ID_A$-$ID_B$-$ID_C$-$ID_d$ include three same signal source identifiers: $ID_A$, $ID_B$, and $ID_D$, and $ID_A$-$ID_B$-$ID_H$-$ID_J$ and the current signal source integrated identifier $ID_A$-$ID_B$-$ID_C$-$ID_d$ include only two same signal source identifiers: $ID_A$ and $ID_B$, $ID_A$-$ID_B$-$ID_D$ is an ultimate target signal source integrated identifier.

When the signal source integrated identifier is generated by sequentially arranging the signal source identifiers based on the signal strengths of the signal sources, the first condition further includes the following third condition.

Third condition: A candidate signal source identifier that first matches a signal source identifier included in the current signal source integrated identifier is determined as the target signal source integrated identifier.

For example, if the current signal source integrated identifier is $ID_A$-$ID_B$-$ID_C$-$ID_D$, assuming that the value of N is 3, and it is determined, by viewing the mapping table shown in Table 3, that there are three signal source integrated identifiers, which are respectively $ID_A$-$ID_B$-$ID_D$, $ID_A$-$ID_B$-$ID_D$-$ID_J$, and $ID_A$-$ID_B$-$ID_C$-$ID_J$, satisfying the first condition, because $ID_A$-$ID_B$-$ID_C$-$ID_J$ first matches $ID_C$, $ID_A$-$ID_B$-$ID_C$-$ID_J$ is determined as an ultimate target signal source integrated identifier.

Optionally, when the mapping relationship table further includes an establishment time of the mapping relationship between a signal source integrated identifier and a location, the first condition further includes the following fourth condition.

Fourth condition: A signal source integrated identifier with the latest establishment time of the mapping relationship is determined as the target signal source integrated identifier.

For example, if the current signal source integrated identifier is $ID_A$-$ID_B$-$ID_C$-$ID_D$, assuming that the value of N is 3, and it is determined, by viewing the mapping table shown in Table 3, that there are two signal source integrated identifiers, which are respectively $ID_A$-$ID_B$-$ID_D$ and $ID_A$-$ID_B$-$ID_C$-$ID_J$, satisfying the first condition, and establishment time of mapping relationships corresponding to the two signal source integrated identifiers is respectively Jan. 1, 2017, 09:58 and Jan. 2, 2017, 07:58, because the establishment time (Jan. 2, 2017, 07:58) of the mapping relationship corresponding to $ID_A$-$ID_B$-$ID_C$-$ID_J$ is the latest, $ID_A$-$ID_B$-$ID_C$-$ID_J$ is determined as an ultimate target signal source integrated identifier.

Optionally, when the signal source integrated identifier is indicated in a form of a matrix (a set may be considered as a one-dimensional matrix), a quantity of same elements in one-dimensional matrices corresponding to a stored signal source integrated identifier and the current signal source integrated identifier may be determined through comparison, to determine the target signal source integrated identifier. A signal source integrated identifier corresponding to a matrix including the largest quantity of same elements as the matrix corresponding to the current signal source integrated identifier is determined as the target signal source integrated identifier.

When there are a plurality of signal source integrated identifiers satisfying the foregoing condition, a signal source integrated identifier corresponding to a matrix including the largest quantity of same elements at a same location as the matrix corresponding to the current signal source integrated identifier is determined as the target signal source integrated identifier.

Alternatively, when a plurality of signal source integrated identifiers satisfying the first condition are obtained through matching, an element at each location in each of the plurality of signal source integrated identifiers obtained through matching may be compared with an element at each location in the current signal source integrated identifier, and a signal source integrated identifier first matching a signal source identifier having a higher signal strength is determined as the target signal source integrated identifier. For example, if the current signal source integrated identifier is [$ID_A$ $ID_B$ $ID_C$ $ID_D$], and signal source integrated identifiers satisfying the first condition include [$ID_B$ $ID_D$ $ID_C$ $ID_J$] and [$ID_B$ $ID_C$ $ID_A$ $ID_J$], matching is performed between elements in [$ID_B$ $ID_D$ $ID_C$ $ID_J$] and elements in [$ID_A$ $ID_B$ $ID_C$ $ID_D$], a first same element obtained through matching is $ID_B$, and a second same element obtained through matching is $ID_D$; and matching is performed between an element at each location in $[ID_B\ ID_D\ ID_C\ ID_J]$ and the elements in $[ID_A\ ID_B\ ID_C\ ID_D]$, a first same element obtained through matching is $ID_B$, and a second same element obtained through matching is $ID_C$. Because the terminal detects that the signal strength of the cell C is greater than the signal strength of the cell D, and $[ID_B\ ID_C\ ID_A\ ID_J]$ first matches $ID_C$, $[ID_B\ ID_C\ ID_A\ ID_J]$ is determined as the target signal source integrated identifier. For a specific implementation of matching between elements in matrices, refer to the prior art, and details are not described herein.

The first condition, the second condition, the third condition, and the fourth condition may be combined with each other, and a candidate signal source integrated identifier satisfying the largest quantity of constraint conditions is an ultimate target signal source integrated identifier.

To more clearly describe the method provided in this embodiment of this application, for example, as shown in Table 5, the mapping relationship table stores the following mapping relationship:

TABLE 5

| Cell integrated identifier | Location | Generation time of a mapping relationship |
|---|---|---|
| $ID_A$-$ID_B$ | Location P | 2017 Jan. 1, 09:58 |

Figure 1A:
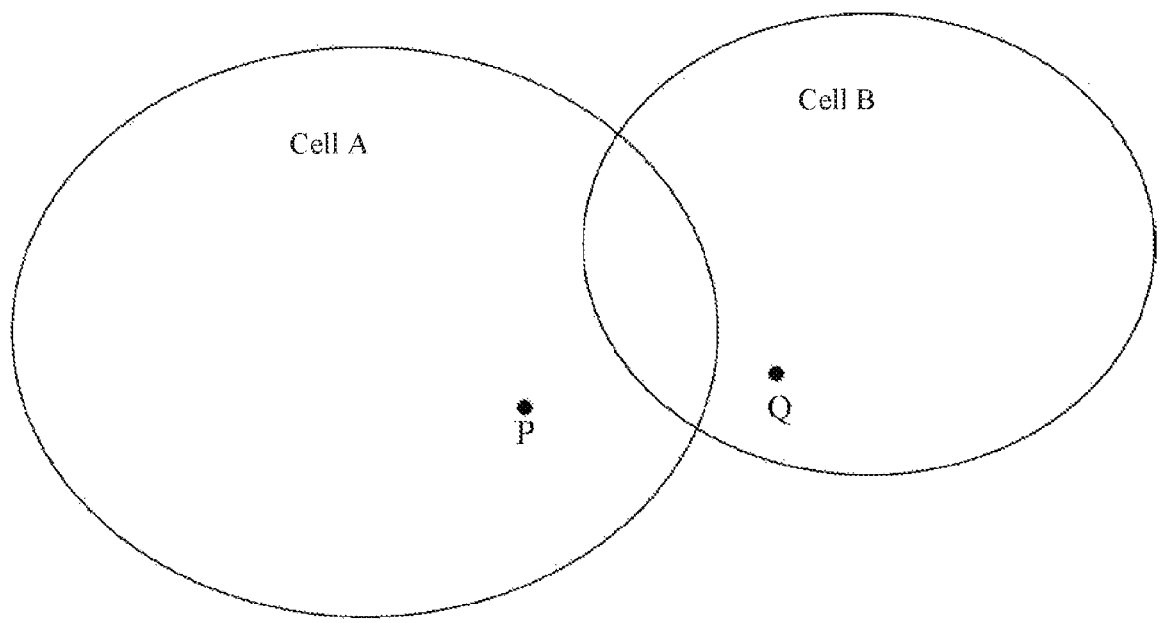
FIG. 1a and FIG. 1b are schematic diagrams each showing that an effective assisted location cannot be provided when an assisted location is provided by using a method in the prior art.

When the method provided in this embodiment of this application is applied to the scenario shown in FIG. 1a, when the terminal moves to Q and requires positioning, the terminal determines that a current cell integrated identifier is $ID_B$-$ID_A$. Because the cell integrated identifier and the identifier $ID_A$-$ID_B$ stored in the mapping relationship table both include the identifiers of the cell A and the cell B, the identifier $ID_A$-$ID_B$ stored in the mapping relationship table is used as a target cell integrated identifier, and a location corresponding to the target cell integrated identifier, namely, a location P is used as an assisted location required during positioning at Q. It can be learned that, compared with the prior art, in this application, the location P can be used as the assisted location required during the positioning at Q, thereby implementing rapid positioning at Q.

Figure 1B:
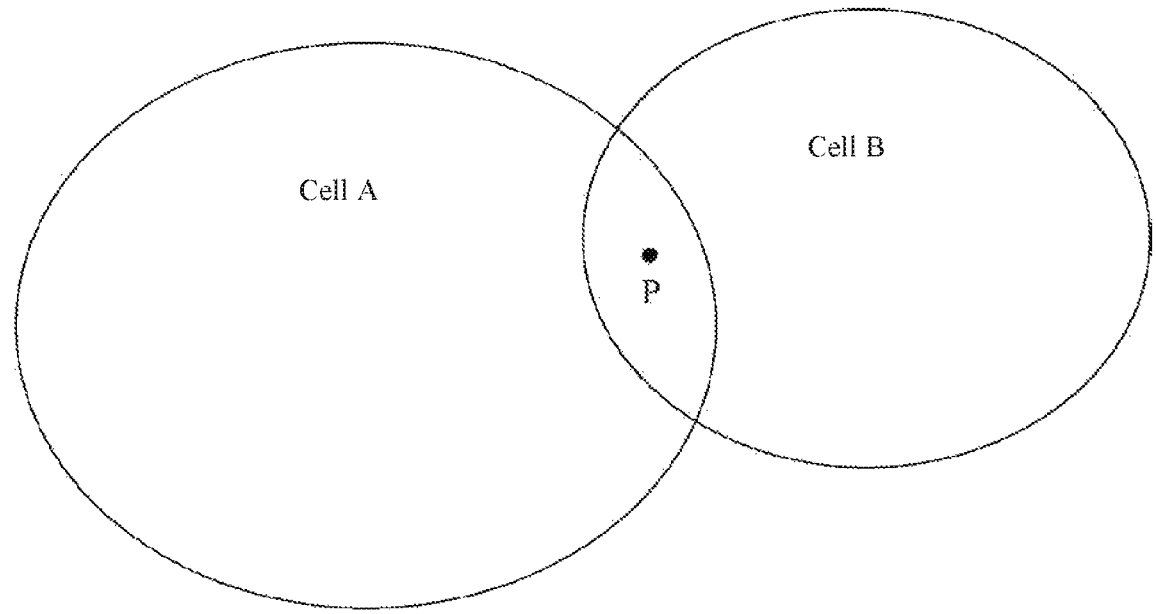

When the method provided in this embodiment of this application is applied to the scenario shown in FIG. 1b, when the terminal moves to P again and requires positioning, a current cell integrated identifier of the terminal is determined as $ID_B$-$ID_A$ or $ID_A$-$ID_B$ (which may be specifically determined according to an actual case). Because the cell integrated identifier and the identifier $ID_A$-$ID_B$ stored in the mapping relationship table both include the identifiers of the cell A and the cell B, the identifier $ID_A$-$ID_B$ stored in the mapping relationship table is used as a target cell integrated identifier, and a location corresponding to the target cell integrated identifier, namely, the location P stored in the mapping relationship table, is used as an assisted location required during positioning. It can be learned that, compared with the prior art in which because a current cell with which registration is performed is the cell B when the terminal moves to Q again, the location P in the mapping relationship stored when registration is performed in the cell A cannot be used as an assisted location, in this embodiment of this application, the location P in the stored mapping relationship can be used as an assisted location, thereby implementing rapid positioning when the terminal moves to P again.

Figure 5:
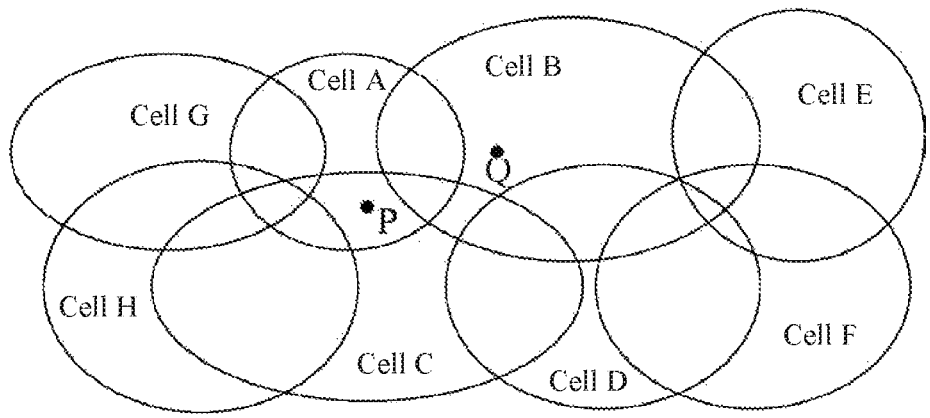
FIG. 5 is a schematic diagram of an application scenario according to an embodiment of this application.

For example, when the method provided in this embodiment of this application is applied to a case shown in FIG. 5, when the terminal is located at P, a location P, a cell identifier A, and a cell integrated identifier, namely, $ID_A$-$ID_C$-$ID_B$-$ID_D$ are obtained, and a mapping relationship between the cell integrated identifier and the location P is established. When the terminal moves to Q and requires positioning, the terminal collects the identifiers of the cells A, B, C, and D and the signal strengths, and generates a cell integrated identifier based on a descending order of the signal strengths. In this case, the cell integrated identifier may be $ID_B$-$ID_A$-$ID_D$-$ID_C$, and a cell identifier B may exist. In this case, although Q is relatively close to P, but the cell identifiers are different, and according to the solution in the prior art, a location at Q cannot be obtained through matching, while if the method in this embodiment of this application is used, a similarity between $ID_B$-$ID_A$-$ID_D$-$ID_C$ and $ID_A$-$ID_C$-$ID_B$-$ID_D$ conforms to a particular rule, and $ID_B$-$ID_A$-$ID_D$-$ID_C$ can successfully match $ID_A$-$ID_C$-$ID_B$-$ID_D$, so that the location P is used as an assisted location required during positioning at Q.

It can be learned that, in this embodiment of this application, when a mapping relationship is established, instead of establishing a mapping relationship between a cell with which the terminal registers and a location, a correspondence between the cell integrated identifier in this embodiment of this application and a location is established. Therefore, provided that the mapping relationship table stores a target cell integrated identifier whose similarity to the current cell integrated identifier satisfies a condition, a location corresponding to the target cell integrated identifier can be determined as an assisted location.

During actual application, after the method provided in this embodiment of this application is used, because the assisted location can be provided, after the assisted location is provided, the terminal can rapidly track a satellite near the assisted location, so that a speed of tracking the satellite by the terminal can be increased, to implement rapid satellite positioning. In open space (there is no high building or other obstacles around), a time to first fix of the terminal can be reduced by approximately 50%. In an occluded environment (a double-sided/three-sided occlusion test), a time to first fix can be reduced by approximately 80% to 90%.

In conclusion, according to the positioning method provided in this embodiment of this application, after determining the current signal source integrated identifier, the terminal searches the mapping relationship table storing the mapping relationship between a signal source integrated identifier and a location, to determine a location corresponding to a signal source integrated identifier most similar to the current signal source integrated identifier as an assisted location. It can be learned that, in the foregoing method provided in this embodiment of this application, the assisted location is determined based on the signal source integrated identifier, and the signal source integrated identifier consists of the identifiers of the M signal sources whose signal strengths can be detected by the terminal. Therefore, the signal source integrated identifier can reflect a relationship between the terminal and coverage of the plurality of signal sources, and indicates that the terminal may be located within the coverage of the plurality of signal sources. In this way, when the assisted location is determined, compared with the prior art in which only a cell with which a terminal registers is considered, in the method provided in this application, the plurality of signal sources are comprehensively considered, and locations corresponding to the plurality of signal sources can all be considered, to provide an effective assisted location.

Figure 6:
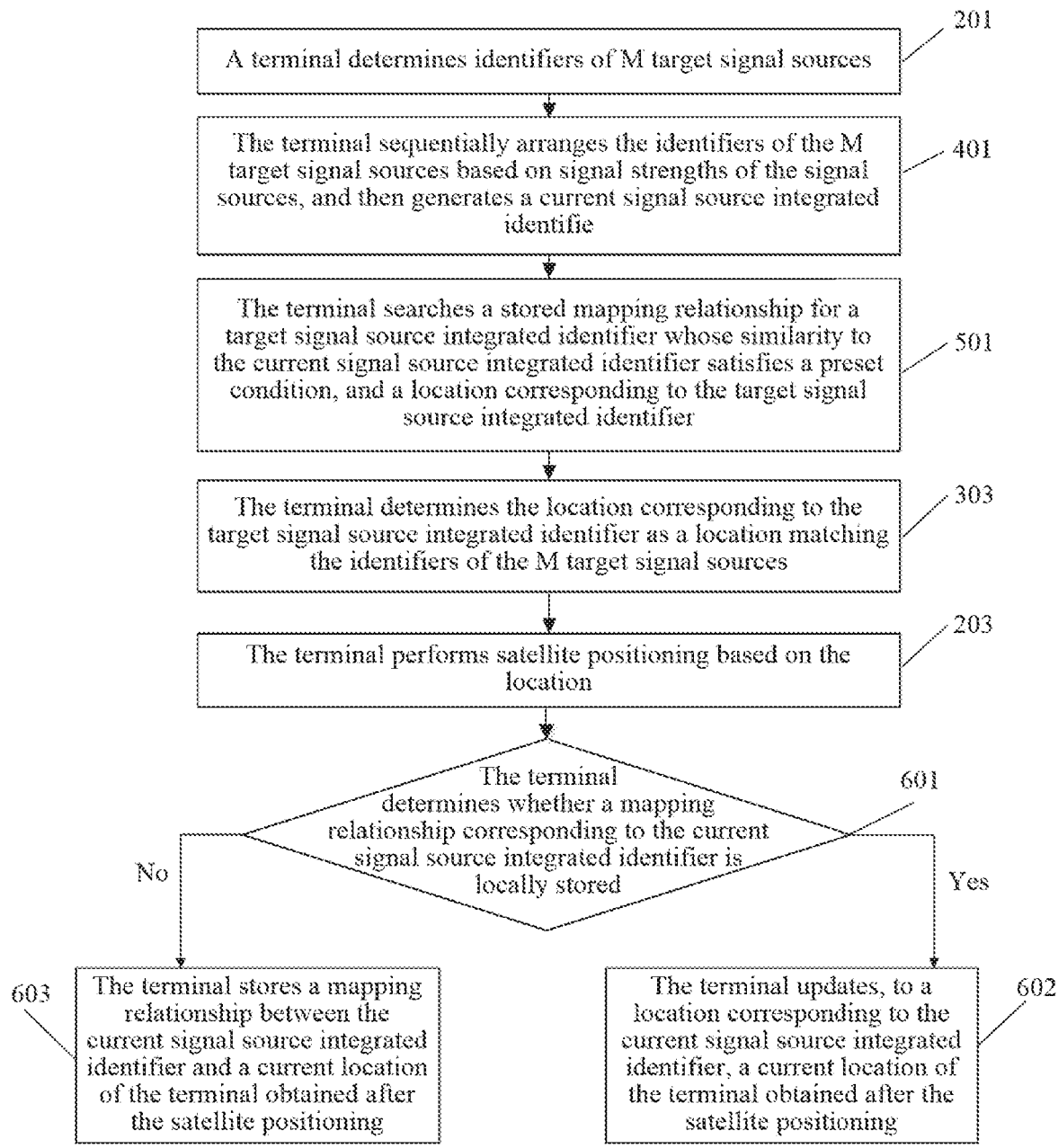
FIG. 6 is a flowchart of a method for updating a mapping relationship between a signal source integrated identifier and a. location according to an embodiment of this application.

In some embodiments, during initial establishment of the mapping table storing the mapping relationship between a signal source integrated identifier and a location, location information may be obtained in another positioning manner, for example, location information is obtained through Wi-Fi positioning or base station positioning, or by performing positioning in another manner; and the corresponding signal source integrated identifier of the terminal at the location is determined, to store the mapping relationship between a signal source integrated identifier and a. location. Subsequently, the mapping table storing the mapping relationship may be continually updated according to an actual case, including deleting an existing mapping relationship, adding a new mapping relationship, or modifying a signal source integrated identifier or a location in an existing mapping relationship. Therefore, after step 204 of "performing, by the terminal, satellite positioning based on the location", as shown in FIG. 6, the method provided in this embodiment of this application further includes the following steps.

Step 601: The terminal determines whether a mapping relationship corresponding to the current signal source integrated identifier is locally stored.

If yes, the following step 602 is performed; or if not, the following step 603 is performed.

Step 602: The terminal updates, to a location corresponding to the current signal source integrated identifier, a current location of the terminal obtained after the satellite positioning.

By performing step 602, when the terminal already stores the mapping relationship between a current signal source integrated identifier and a location, the location of the signal source integrated identifier already stored in the mapping relationship table is replaced with a new location, to update the location corresponding to the signal source integrated identifier.

Step 603: The terminal stores a mapping relationship between the current signal source integrated identifier and a current location of the terminal obtained after the satellite positioning.

By performing this step, when the terminal does not store the mapping relationship between a current signal source integrated identifier and a location, the mapping relationship between the current signal source integrated identifier and the current location of the terminal obtained after the satellite positioning is added to the mapping relationship table as a new mapping relationship.

During actual application, the terminal may maintain both a mapping table storing a mapping relationship between a wireless access point integrated identifier and a location (for ease of description, referred to as an AP-location mapping table for short), and a mapping table storing a mapping relationship between a cell integrated identifier and a location for ease of description, referred to as a cell-location mapping table).

In this way, when the terminal can communicate with a base station, if a subscriber identification module (Subscriber Identification Module, SIM) card or an eSIM card is installed in the terminal (the SIM card is used as an example for description below), and the SIM card is in an effective state, the terminal can detect a signal strength and a signal identifier of a surrounding cell, and further can view the cell-location mapping table, to determine a target cell integrated identifier and determine an assisted location.

If the terminal cannot communicate with a base station, for example, no SIM card is installed in the terminal or an SIM card is in an ineffective state, but the terminal enables a function of scanning a wireless access point, to be specific, the terminal can detect an identifier and a signal strength of a surrounding wireless access point, the terminal may view the AP-location mapping table, to determine a target wireless access point integrated identifier and determine an assisted location.

If the terminal can communicate with a base station (for example, an SIM card in the terminal is in an effective state) and the terminal enables a function of scanning a wireless access point, in an optional manner, the AP-location mapping table or the cell-location mapping table is randomly selected to determine an assisted location. Because an AP has smaller coverage and more accurate positioning is implemented by using the AP, in another optional manner, the AP-location mapping table is viewed first, and if an assisted location can be determined in the AP-location mapping table, the location is determined as the assisted location; or if an assisted location cannot be determined in the AP-location mapping table, the cell-location mapping table is viewed to determine an assisted location.

Figure 7A:
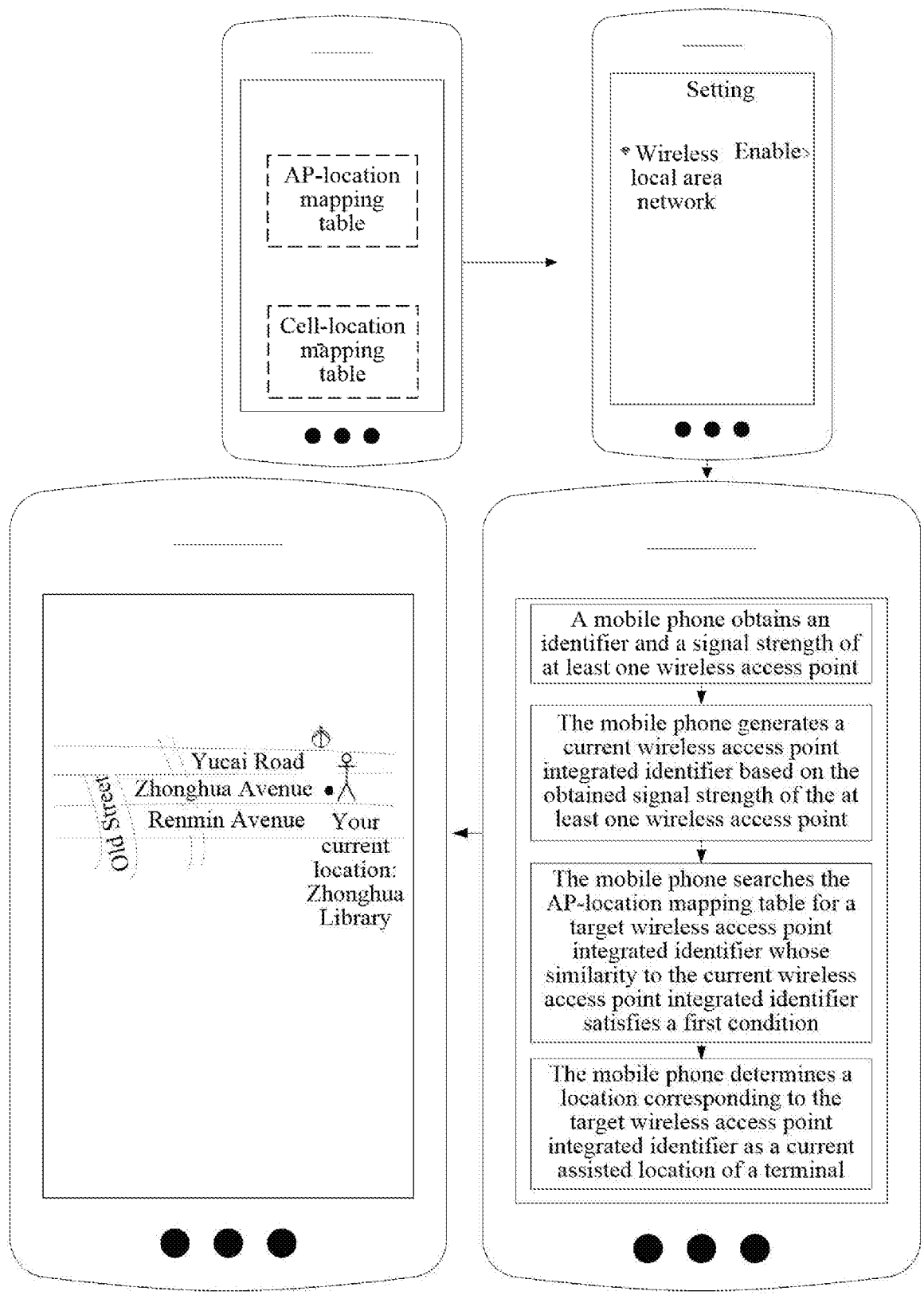
FIG. 7a is a schematic diagram. of a process of applying a positioning method to an actual scenario according to an embodiment of this application.
Figure 7B:
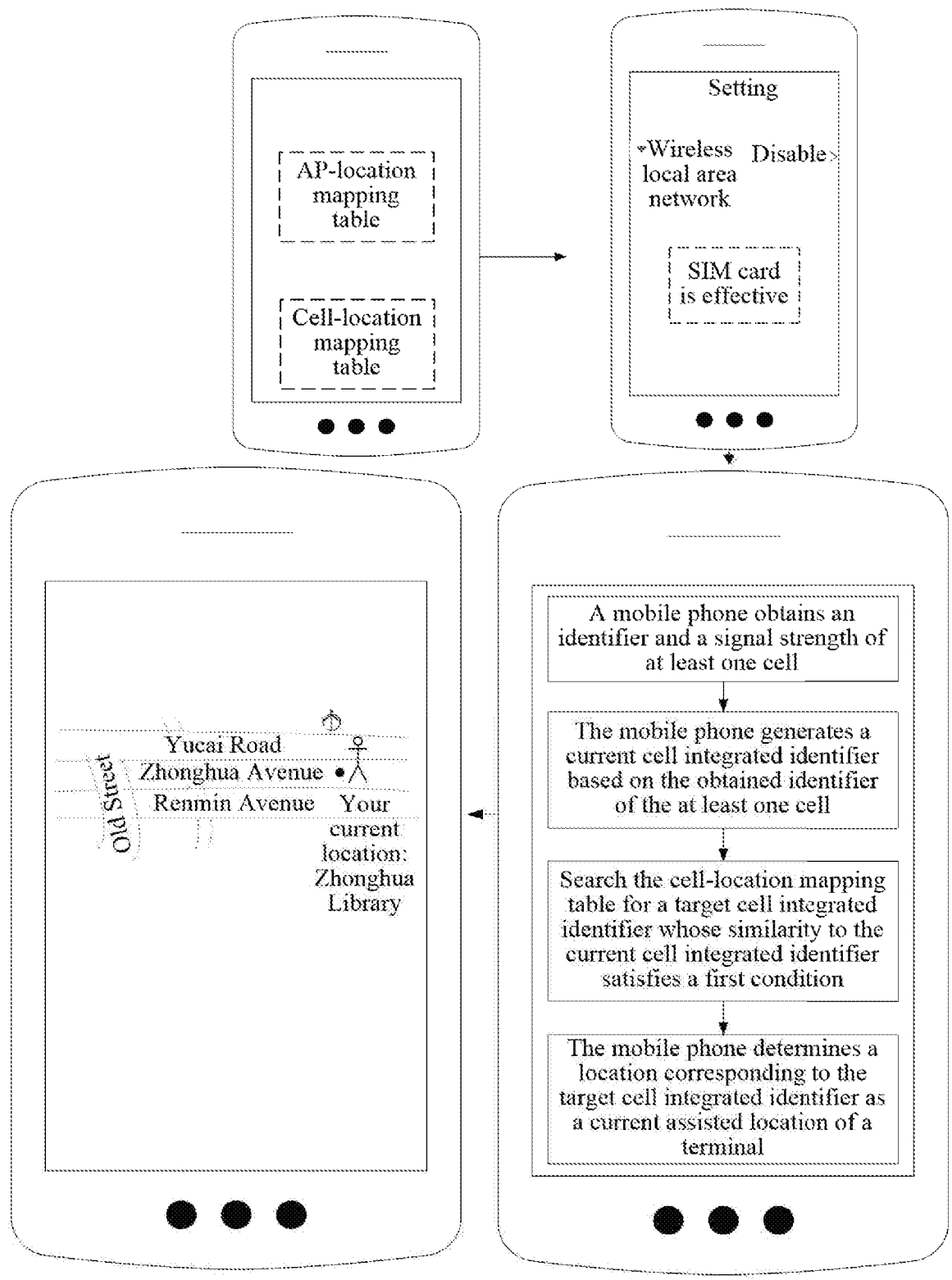
FIG. 7b is a schematic diagram of a process of applying a positioning method to an actual scenario according to an embodiment of this application.

Using an example in which the terminal is a mobile phone, with reference to an actual application scenario, as shown in FIG. 7a, the mobile phone maintains both the AP-location mapping table and the cell-location mapping table. When a user requires positioning, if the user enables the function of scanning a wireless access point, the mobile phone determines a current wireless access point integrated identifier, searches the AP-location mapping table for a target wireless access point integrated identifier whose similarity to the current wireless access point integrated identifier satisfies a condition, and determines a location corresponding to the target wireless access point integrated identifier as an assisted location. If the user does not enable the function of scanning a wireless access point, as shown in FIG. 7b, the mobile phone determines a current cell integrated identifier, searches the cell-location mapping table for a target cell integrated identifier whose similarity to the current cell integrated identifier satisfies a condition, and determines a location corresponding to the target cell integrated identifier as an assisted location.

It may be understood that, to implement the foregoing functions, the terminal includes corresponding hardware structures and/or software modules for performing the functions. A person skilled in the art may be very easily aware that, in combination with the examples described in the embodiments disclosed in the embodiments of this application, units and algorithm steps may be implemented by hardware or a combination of hardware and computer software in this application. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In the embodiments of this application, functional modules of the terminal may be divided according to the foregoing method examples. For example, functional modules may be divided corresponding to functions, or two or more functions may be integrated into one processing module. The integrated module may be implemented in a form of hardware, or may be implemented in a form of a software functional module. It should be noted that module division in the embodiments of this application is an example and is merely logical function division. During actual implementation, there may be another division manner.

Figure 8A:
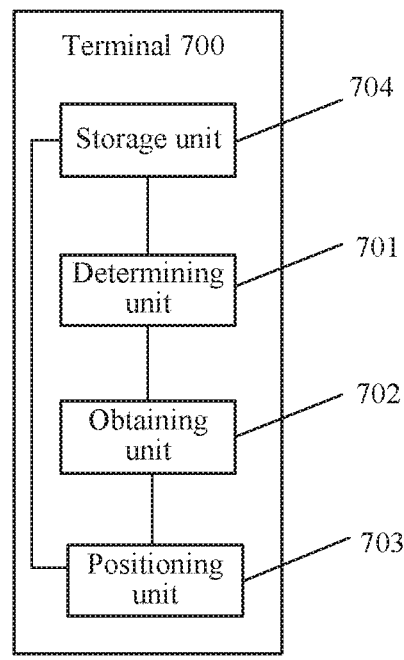
FIG. 8a is a schematic structural diagram of a terminal according to an. embodiment of this application.

When the functional modules are divided by using corresponding functions, FIG. 8a is a possible schematic structural diagram of the terminal in the foregoing embodiments. The terminal 700 includes a determining unit 701, an obtaining unit 702, a positioning unit 703, and a storage unit 704. The determining unit 701 is configured to support the terminal 700 in performing the process 201 in FIG. 3a and 601 in FIG. 6. The obtaining unit 702 is configured to support the terminal 700 in performing the process 202 in FIG. 3a, the processes 301, 302, and 303 in FIG. 3b, the process 401 in FIG. 4a, and the process 501 in FIG. 4b, and the positioning unit 703 is configured to support the terminal 700 in performing the process 203 in FIG. 3a. The storage unit 704 is configured to store a mapping relationship between a signal source integrated identifier and a location.

Figure 8B:
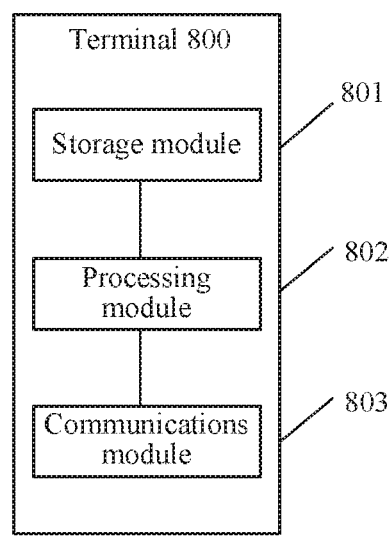
FIG. 8b is a schematic structural diagram of another terminal according to an embodiment of this application.

When an integrated unit is used, FIG. 8b is a possible schematic structural diagram of the terminal in the foregoing embodiments. The terminal 800 includes a processing module 802 and a communications module 803. The processing module 802 is configured to control and manage an action of the terminal. For example, the processing module 802 is configured to support the terminal in performing the processes 201, 202, and 203 in FIG. 3a, the processes 301, 302, and 303 in FIG. 3b, the process 401 in FIG. 4a, the process 501 in FIG. 4b, the processes 601 and 602 in FIG. 6, and/or another process used for the technologies described in the embodiments of this application. A communications module 803 is configured to support communication between the terminal and another network entity, for example, communication with various types of access points and base stations. The terminal may further include a storage module 801, configured to store program code and data of the terminal.

The processing module 802 may be a processor or a controller, such as a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logical device, a transistor logical device, a hardware component, or a combination thereof. The controller/processor may implement or execute various example logical blocks, modules, and circuits described with reference to content disclosed in this application. Alternatively, the processor may he a combination of processors implementing a computing function, for example, a combination of one or more microprocessors, or a combination of the DSP and a microprocessor. The communications module 803 may he a transceiver, a transceiver circuit, a communications interface, or the like. The storage module 801 may be a memory.

When the processing module 802 is a processor, the communications module 803 is a transceiver. When the storage module 801 is a memory, the terminal in this embodiment of this application may be a terminal shown in FIG. 8c.

Figure 8C:
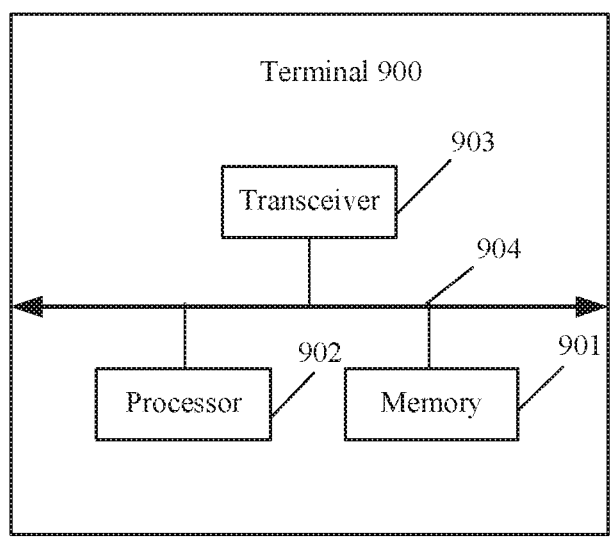
FIG. 8c is a schematic structural diagram of still another terminal according to an embodiment of this application.

As shown in FIG. 8c, the terminal 900 includes a processor 902, a transceiver 903, a memory 901, and a bus 904. The transceiver 903, the processor 902, and the memory 901 are connected to each other by using the bus 904. The bus 904 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one bold line is used for representation in FIG. 8c, but this does not mean that there is only one bus or only one type of bus.

Method or algorithm steps described in combination with the content disclosed in this application may be implemented by hardware, or may be implemented by a processor by executing a software instruction. The software instruction may include a corresponding software module. The software module may be stored in a random access memory (Random Access Memory, RAM), a flash memory, a read-only memory (Read Only Memory, ROM), an erasable programmable read only memory (Erasable Programmable ROM, EPROM), an electrically erasable programmable read only memory (Electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another The storage medium may be any available medium accessible to a general-purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on the technical solutions in this application shall fall within the protection scope of this application.

What is claimed is:

1. A positioning method implemented by an electronic device, the method comprising:
   determining identifiers of target signal sources, wherein the target signal sources have signal strengths that can be detected by the electronic device and that are greater than a preset threshold;
   determining a current signal source integrated identifier based on the identifiers, wherein the current signal source integrated identifier comprises the identifiers;
   searching a stored mapping relationship for a target signal source integrated identifier, wherein the target signal source integrated identifier comprises at least N same signal source identifiers as the current signal source integrated identifier, wherein there are M target signal sources, wherein M is an integer greater than one, and wherein a value of N is an integer greater than or equal to one and less than or equal to M;
determining a location corresponding to the target signal source integrated identifier; and
performing satellite positioning based on the location.

2. The positioning method of claim 1, wherein determining the current signal source integrated identifier comprises:
sequentially arranging the identifiers based on signal strengths of the target signal sources to determine sequentially arranged identifiers; and
generating the current signal source integrated identifier based on the sequentially arranged identifiers.

3. The positioning method of claim 1, wherein the target signal source integrated identifier further comprises a largest quantity of same signal source identifiers as the current signal source integrated identifier when there are at least two signal source integrated identifiers each comprising the at least N same signal source identifiers as the current signal source integrated identifier, and wherein the target signal source integrated identifier is one of the at least two signal source integrated identifiers.

4. The positioning method of claim 1, further comprising storing establishment times of mapping relationships between signal source integrated identifiers and corresponding locations, wherein the target signal source integrated identifier further comprises a latest establishment time of the establishment times when there are at least two signal source integrated identifiers each comprising the at least N same signal source identifiers as the current signal source integrated identifier, and wherein the target signal source integrated identifier is one of the at least two signal source integrated identifiers.

5. The positioning method of claim 1, wherein after performing the satellite positioning, the method further comprises:
determining whether a mapping relationship corresponding to the current signal source integrated identifier is locally stored; and
updating a current location of the electronic device obtained after the satellite positioning to a location corresponding to the current signal source integrated identifier when the mapping relationship corresponding to the current signal source integrated identifier is locally stored.

6. The positioning method of claim 5, wherein the method further comprises storing a mapping relationship between the current signal source integrated identifier and the current location of the electronic device obtained after the satellite positioning when the mapping relationship corresponding to the current signal source integrated identifier is not locally stored.

7. The positioning method of claim 1, wherein the target signal sources include a base station.

8. An electronic device, comprising:
a processor; and
a memory coupled to the processor and configured to store programming instructions that, when executed by the processor, cause the electronic device to:
determine identifiers of target signal sources, wherein the target signal sources have signal strengths that can be detected by the electronic device and that are greater than a preset threshold;
determine a current signal source integrated identifier based on the identifiers, wherein the current signal source integrated identifier comprises the identifiers;
search a stored mapping relationship for a target signal source integrated identifier, wherein the target signal source integrated identifier comprises at least N same signal source identifiers as the current signal source integrated identifier, wherein there are M target signal sources, wherein M is an integer greater than one, and wherein a value of N is an integer greater than or equal to one and less than or equal to M;
determine a location corresponding to the target signal source integrated identifier; and
perform satellite positioning based on the location.

9. The electronic device of claim 8 wherein the electronic device determines the current signal source integrated identifier based on the identifiers and is further configured to:
sequentially arrange the identifiers of the target signal sources based on signal strengths of the target signal sources to determine sequentially arranged identifiers; and
generate the current signal source integrated identifier according to the sequentially arranged identifiers.

10. The electronic device of claim 8, wherein the target signal source integrated identifier further comprises a largest quantity of same signal source identifiers as the current signal source integrated identifier when there are at least two signal source integrated identifiers each comprising the at least N same signal source identifiers as the current signal source integrated identifier, and wherein the target signal source integrated identifier is one of the at least two signal source integrated identifiers.

11. The electronic device of claim 8, wherein the electronic device is further configured to store establishment times of mapping relationships between signal source integrated identifiers and corresponding locations, wherein the target signal source integrated identifier further comprises a latest establishment time of the establishment times when there are at least two signal source integrated identifiers each comprising the at least N same signal source identifiers as the current signal source integrated identifier, and wherein the target signal source integrated identifier is one of the at least two signal source integrated identifiers.

12. The electronic device of claim 8, wherein the electronic device is further configured to:
determine whether a mapping relationship corresponding to the current signal source integrated identifier is locally stored; and
update a current location of the electronic device obtained after the satellite positioning to a location corresponding to the current signal source integrated identifier when the mapping relationship corresponding to the current signal source integrated identifier is locally stored.

13. The electronic device of claim 12, wherein the electronic device is further configured to store a mapping relationship between the current signal source integrated identifier and the current location of the electronic device obtained after the satellite positioning when the mapping relationship corresponding to the current signal source integrated identifier is not locally stored.

14. The electronic device of claim 8, wherein the target signal sources include a wireless routing device.

15. A computer program product comprising computer-executable instructions stored on a non-transitory computer-readable medium that, when executed by a processor, cause an electronic device to:
determine identifiers of target signal sources, wherein the target signal sources have signal strengths that can be detected by the electronic device and that are greater than a preset threshold;

determine a current signal source integrated identifier based on the identifiers, wherein the current signal source integrated identifier comprises the identifiers of the target signal sources;

search a stored mapping relationship for a target signal source integrated identifier wherein the target signal source integrated identifier comprises at least N same signal source identifiers as the current signal source integrated identifier, wherein there are M target signal sources, wherein M is an integer greater than one, and wherein a value of N is an integer greater than or equal to one and less than or equal to M;

determine a location corresponding to the target signal source integrated identifier; and perform satellite positioning based on the location.

16. The computer program product of claim 15, wherein the computer-executable instructions cause the electronic device to determine the current signal source integrated identifier based on the identifiers by causing the electronic device to:

sequentially arrange the identifiers based on signal strengths of the target signal sources to determine sequentially arranged identifiers; and generate the current signal source integrated identifier according to the sequentially arranged identifiers.

17. The computer program product of claim 15, wherein the target signal source integrated identifier further comprises a largest quantity of same signal source identifiers as the current signal source integrated identifier when there are at least two signal source integrated identifiers each comprising the at least N same signal source identifiers as the current signal source integrated identifier, and wherein the target signal source integrated identifier is one of the at least two signal source integrated identifiers.

18. The computer program product of claim 15, wherein the computer program product is further configured to store establishment times of mapping relationships between signal source integrated identifiers and corresponding locations, wherein target signal source integrated identifier further comprises a signal source integrated identifier having a latest establishment time of the establishment times when there are at least two signal source integrated identifiers each comprising the at least N same signal source identifiers as the current signal source integrated identifier, and wherein the target signal source integrated identifier is one of the at least two signal source integrated identifiers.

19. The computer program product of claim 15, wherein the computer-executable instructions are further configured to cause the electronic device to:

determine whether a mapping relationship corresponding to the current signal source integrated identifier is locally stored; and update a current location of the electronic device obtained after the satellite positioning to a location corresponding to the current signal source integrated identifier when the mapping relationship corresponding to the current signal source integrated identifier is locally stored.

20. The computer program product of claim 19, wherein the computer-executable instructions are further configured to cause the electronic device to store a mapping relationship between the current signal source integrated identifier and the current location of the electronic device obtained after the satellite positioning when the mapping relationship corresponding to the current signal source integrated identifier is not locally stored.

* * * * *